United States Patent [19]
Hed

[11] Patent Number: 5,047,392
[45] Date of Patent: Sep. 10, 1991

[54] DIAMAGNETIC COLLOIDS BASED SEALS

[75] Inventor: Aharon Z. Hed, Nashua, N.H.
[73] Assignee: Troy Investments Inc., Nashua, N.H.
[21] Appl. No.: 334,582
[22] Filed: Mar. 21, 1989
[51] Int. Cl.⁵ .............................................. F16C 33/74
[52] U.S. Cl. ......................................... 505/1; 277/80;
      277/135; 277/DIG. 6; 505/700
[58] Field of Search .................. 277/80, 135, DIG. 6;
      505/1, 700

[56] References Cited

U.S. PATENT DOCUMENTS 4,380,356 4/1983 Weghaupt ............................. 277/80

FOREIGN PATENT DOCUMENTS 420836 8/1974 U.S.S.R. ................................ 277/80
631726 11/1978 U.S.S.R. ................................ 277/80

Primary Examiner—Allan N. Shoap
Assistant Examiner—Scott Cummings
Attorney, Agent, or Firm—Herbert Dubno

[57] ABSTRACT

Diamagnetic colloids of superconductive particles form stationary, rotary and translational seals by the use of appropriate magnetic fields. Specific embodiments include a generalized stationary seal and a family of rotary seals with opposing surfaces.

12 Claims, 2 Drawing Sheets

DIAMAGNETIC COLLOIDS BASED SEALS

CROSS REFERENCE TO RELATED APPLICATION

This application relates to my copending applications Ser. No. 07/281,832 filed on 8 Dec. 1988 entitled "Diamagnetic Colloids Containing Superconducting Particles; Ser. No. 07/314,426 filed on 22 Feb. 1989 entitled "Electronic Modulation of Magnetic Fields"; Ser. No. 07/314,427 filed on 22 Feb. 1989 entitled "Switchable Superconducting Elements and Pixels Arrays"; Ser. No. 07/334,584 filed on 21 Mar. 1989 entitled "Magnetic Flux Concentrators and Diffusers"; Ser. No. 07/334,583 filed on 21 Mar. 1989 entitled "Temporal and Spatial Control of Field Topology in Solenoids."

FIELD OF THE INVENTION

My present invention relates to a novel family of seals created when a diamagnetic colloid is captured in a minimum magnetic field thus creating a barrier allowing movement between two surfaces but sealing one space from another space with the diamagnetic colloid.

BACKGROUND OF THE INVENTION

Ferrofluidic seals are currently used in a broad variety of products. Millions have been installed in Winchester drives, and thousand are used in a variety of vacuum feedthroughs. Despite the maturity of the technology, it is well recognized that these seals suffer from some disadvantages. These shortcomings can be traced mostly to the nature and stability of the ferrofluids themselves.

Ferrofluids are chemically stabilized colloids. As such their stability depends on the chemical stability of the carriers, surfactants and dispersants used each separately and as a suspension medium for the ferromagnetic particles. While this technology is proprietary it is well known that the life of most versatile ferrofluids is limited by the deterioration of their chemistries.

Furthermore, most ferrofluids have an additional major deficiency, namely, their dynamic range of operation. This is due to the fact that in the majority of carriers the viscosity rapidly decreases with increasing temperature, thus a seal designed for a given rotation rate cannot be operated at much higher rotation rates. Despite the maturity of the technology, ferrofluids based on silicones are still not available, yet silicone carriers are superior to existing technology in a number of applications where weak dependence of viscosity on temperature and where large operating temperature intervals including cryogenic ranges are called for.

To remedy most of these shortcomings I have invented a new family of colloidal systems in which colloidization is established by pure physical means. These colloids which we have called "Diamagnetic Colloids" or "Diocols" have been described in a copending application Ser. No. 07/281,832 entitled "Diamagnetic Colloids Containing Superconducting Particles" and have the unique property that they can be positioned and moved in magnetic fields by means that can be termed opposite to those used with ferrofluids. Specifically, while ferrofluids seek magnetic field flux maxima, diamagnetic colloids seek magnetic field minima.

The design of diamagnetic colloids based seals is thus reduced to the proper choice of the carrier fluid, the superconducting particles that are suspended in that carrier fluid and the design of magnetic field circuits possessing topologies with minima where the seal is to be formed.

OBJECTS OF THE INVENTION

It is an object of this invention to provide improved seals using diamagnetic colloids containing superconducting particles.

It is another object of this invention to provide improved static seals.

Yet another object of this invention is to provide improved seals between mutually moving surfaces.

SUMMARY OF THE INVENTION

These objects are achieved by activating a magnetic circuit having a field intensity minimum at the line where the seal is desired, forming a diamagnetic colloid of the desired cryogenic liquids by dispersing in that liquid superconducting particles, and placing the diamagnetic colloid in the area where the seal is desired. The presence of the magnetic field minimum at the location of the seal assures that the diamagnetic colloid does not leak out of the seal.

The invention is based on the magnetic properties of a new class of colloids, the diamagnetic colloids. This class is unique in that colloidization is induced purely by physical rather than chemical means. Therefore, any liquid can be converted into a colloid by techniques taught in my copending application Ser. No. 07/281,832 entitled "Diamagnetic Colloids Containing Superconducting Particles." These diamagnetic colloids always seek minima in magnetic fields, thus the essence of the present invention is the creation of fluid seals whereby the fluids are held at the seal location by forces acting on the diamagnetic colloids. A diamagnetic colloid seal according to this invention consists of an appropriate diamagnetic colloid held in place against gravitational and other forces by magnetic fields. The design of our seals simply assures that at the location where the seal is desired a magnetic field minimum is maintained. Since a magnetic field minimum is maintained at a given location, away from that location magnetic field gradients exist that force the diamagnetic colloid position itself at the magnetic field minimum.

An example of the production of a diamagnetic colloid from this earlier application is a stable diamagnetic colloid suspension formed by introducing particles of a complex superconductive oxide of yttrium barium and copper, i.e. a so-called 1, 2, 3 superconductor which generally can be considered to have the formula $YBa_2Cu_3O_7\text{-}\sigma$ with a particle size of substantially 2 to 15 microns and preferably with a mean particle size of about 10 microns into liquid nitrogen at 75 K., a temperature at which the particles are superconductive. The particles can make up up to 80% by volume of the suspension, are generally spherical as far as their topology is concerned, and can be present in an amount as low as 5% by volume of the suspension.

A magnetic field applied to the suspension of as little as $0.5 \times 10^{-4}$ tesla, either in the form of the earth's magnetic field or in the form of an externally applied field will maintain the suspension in a stable form.

The temperature range in which my seals can operate has an upper limit determined by either the critical temperature of the superconducting-particle suspension forming the diamagnetic colloid, or by the properties of the carrier fluid, namely its vapor pressure or its boiling point. The lower limit is usually limited by the freezing point of the fluid and in some more complex fluids, like silicones, where upon cooling a glass phase is formed rather than a crystalline solid, by the lowest pouring temperature.

One can consider applications with fluids at temperatures below such pouring temperatures, if the application does not require excessive motion, for instance in some stationary or low amplitude vibrational seals.

The present invention has immediate applications with the new oxide superconductors, some of which are reported to exhibit the Meissner effect to some extent up to 200 K.

The below listed fluids can serve as carrier for the diamagnetic colloid to be used as seals in this invention. It should be understood, however, that many other fluids not listed here, could be used, providing that their properties are within the limitations cited above.

To this list one can add a large number of commercially available silicones with pouring points under 170 K. (some with pouring points as low as 130 K. which are proprietary to companies like Dow Chemical Corporation and Petrach Systems Silanes, a division of Huls America Inc).

The tables name the specific fluids and their respective melting and boiling points, thus facilitating the choice of a carrier for their specific application.

| CRYOGENIC CARRIER FLUIDS | | | | |
|---|---|---|---|---|
| | Melting point | | Boiling Point | |
| Name: | C | K | C | K |
| Hypofluorous Acid Trifluoro methyl ester $F_3COF$ | −215 | 58 | −95 | 178 |
| Nitrosotrifluoromethane $F_3CNO$ | −197 | 76 | −84 | 189 |
| Propylene $CH_3CH:CH_2$ | −185 | 88 | −47 | 226 |
| Alpha-Butylene $CH_3CH_2CH:CH_2$ | −185 | 88 | −6 | 267 |
| Chlorotrifluoromethane (Freon-13) $ClCF_3$ | −181 | 92 | −81 | 192 |
| Orthovanadic Acid triisopropyl ester $\{[CH_3]_2CHO\}_3VO$ | −180 | 93 | 124 | 397 |
| Methylcyclopropane $C_4H_8$ | −177 | 96 | 5 | 278 |
| Hexane, hexane, dl $CH_3CH_2CH_2(CH_3)CH_2CH_3$ | −173 | 100 | 92 | 371 |
| Trimethyl-2-Butene $(CH_3)_2CHCH:CH_2$ | −168 | 105 | 20 | 293 |
| 2-Pentanethiol | −169 | 106 | 112 | 385 |

| FLUORINATED HYDROCARBONS | | | | |
|---|---|---|---|---|
| | Melting point | | Boiling Point | |
| Name: | C | K | C | K |
| $CF_4$ | −184 | 89 | −128 | 145 |
| $CClF_3$ | −181 | 92 | −81 | 192 |
| $CBrF_3$ | −168 | 105 | −58 | 215 |
| $CHClF_2$ | −168 | 113 | −41 | 232 |
| $CCl_2F_2$ | −158 | 115 | −30 | 243 |
| $CHF_3$ | −155 | 118 | −82 | 191 |
| $CHCl_2F$ | −135 | 138 | 9 | 282 |
| $CCl_3F$ | −111 | 162 | 24 | 297 |
| $C_2Br_2F_4$ | −110 | 163 | 47 | 320 |
| $C_2ClF_5$ | −106 | 167 | −39 | 234 |

When designing a seal for a specific application, it is necessary to consider additional properties of cryogenic carriers, including the ability to wet the superconducting particles, flammability, surface tension, vapor pressure at the intended operational temperatures and viscosity at such temperatures.

The adhesion of the fluid to the superconducting particles can be improved to provide better wetting angles between the superconducting particles and the carrier fluid by appropriate surface treatment of the superconducting particles without a negative impact on the diamagnetic colloid, since as explained in the copending application Ser. No. 07/281,832 entitled "Diamagnetic Colloids Containing Superconducting Particles," the superconducting particles can be coated to provide barriers to interaction with the carrier fluid as well as additional properties, without influencing the Meissner effect induced mutual repulsion of the particles.

BRIEF DESCRIPTION OF THE DRAWING

The above objects, features and advantages of the invention will become more readily apparent from the following description, reference being made to the accompanying drawing in which.

SPECIFIC DESCRIPTION

Figure 1A:
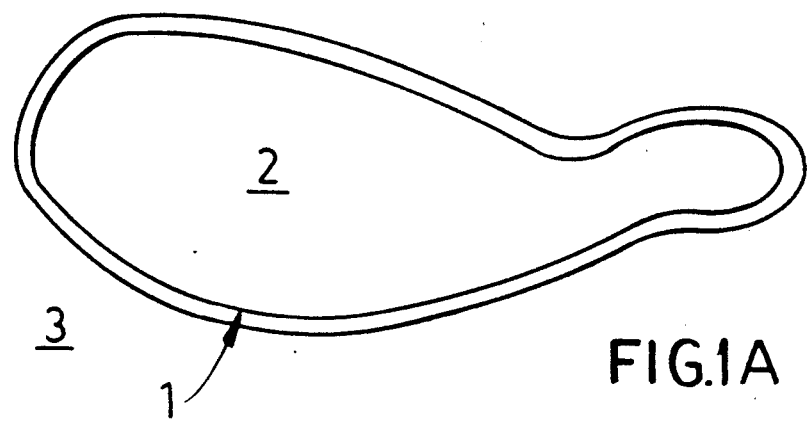
FIG. 1 is a diagram of a very generalized stationary seal.
FIG. 1B is a cross sectional view showing its formation.
FIG. 1C is a section representing a modification of FIG. 1B.

Let us refer now to FIG. 1A which shows a top view of an irregularly shaped seal 1. While in this Figure the sealing area is shown to be planar, it should be self-evident that seals of the same various geometries curved outside of a given plane are possible, as are seals whose mating (but not necessarily contacting) surfaces are curved rather than planar.

Figure 1B:
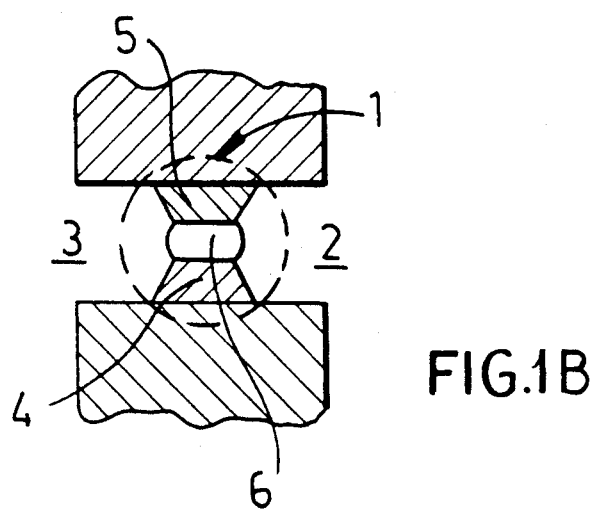

Under most circumstances, a seal is required to separate an inner volume 2 from an outer space 3. In FIG. 1B we show an enlarged cross section through the sealing element 1 separating the seal area 2, i.e. the space that is "sealed in," and the outer space 3. Two opposing protrusions 4 and 5 between which the sealing diamagnetic colloid is enclosed provide the actual physical seal. In order to localize a diamagnetic colloid 6 in this space, one need only to create in the space between these protrusions a minimum in the magnetic field present.

One can chose any method to create such magnetic field minima. Such method could be static, for instance by the judicious use of permanent magnets and materials with different magnetic permeability, or by dynamic means, including electromagnets with a variety of topology to create the appropriate field distribution required.

Figure 1C:
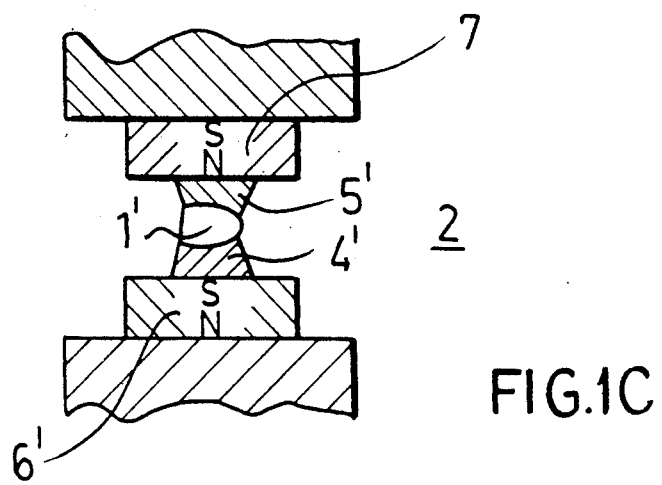

Without limiting the generality of potential means by which such magnetic field minima can be formed, I show in FIG. 1C one such methodology.

As in FIG. 1B, the area of the seal is shown at 1' and is formed by the diamagnetic colloid chosen for the specific application. The "sealed in" space is denoted by 2 and the outer space 3. The opposing protrusions 4' and 5' are here shown to be made of an appropriate superconducting material that is Type II in the intended temperature range of operation of the seal.

The superconducting protrusions are fastened on the face of two opposing permanent magnets 6' and 7, each covering the length of the intended seal and magnetized in such a way that the north pole of one magnet faces the south pole of the second magnet.

If the protrusions 4' and 5' were not superconducting, then the magnetic field lines between the poles would be straight lines connecting the north pole of the magnet 6' to the south pole of the opposing magnet 7. However, due to the presence of the superconducting protrusions 4' and 5' between the poles, the magnetic field in these protrusions is partially excluded, thus creating a magnetic field minimum between the two superconducting protrusions along the totality of the seal. Furthermore, this unique field morphology actually creates a relatively larger magnetic field flux density in the space just outside the gap between the two superconducting protrusions 4' and 5', thus applying a force on the diamagnetic colloid locked in the space 1' between the two protrusions.

It should be noted, however, that in this design, there will be an asymmetry in magnetic field gradients that are on the inner side 2 of the field and on the outer side 3, since the superconducting protrusions each form a closed annulus (or a shape that is topologically equivalent to an annulus when the seal is not a circle), and thus will tend to negate the magnetic field within such annulus. Because I use a type II superconductor, this effect will not be too pronounced. Nevertheless, there is an asymmetry in the gap between the two superconductors, to partially compensate for this effect.

It should be clear that the superconductor strips do not have to actually form protrusions on the surfaces where the seal is desired, and that a similar structure in which the superconductor is embedded in these surfaces will be adequate as well.

It should also be clear that the superconducting strips designed to provide for magnetic field minima do not need to be bound to the surface of the permanent magnets and that an interface made of a slightly paramagnetic or slightly diamagnetic substance between the permanent magnet and the superconductor strips would achieve the goal of creating a magnetic field minimum as well.

It should also be clear that it is not advisable to utilize permanent magnets that have too high a field flux density so as to avoid quenching of the superconducting strips and superconducting particles in the diamagnetic colloids.

It should also be clear, that very refractory superconductors should not be used (particularly Type I) for the superconducting strips, or that if such are used, the design assures a residual magnetic field in the gap between the two superconductors so as to assure the colloidal properties of the diamagnetic colloid.

Finally, the shape of the stationary seal can be freely dictated by the application (any shape that is topologically equivalent to a singly connected ring), as long as along the central line of such a seal a magnetic field minimum can be maintained. Within some limits determined by the gap and the mechanical properties of the diamagnetic colloid), this field minimum can even vary from point to point along the seal. If these variations are too large or fluctuate with time, however, the diamagnetic colloid will flow excessively to the field minima within the central line of the seal, with a possible seal failure at the field maxima along the minimal field line (seal central line).

Figure 2:
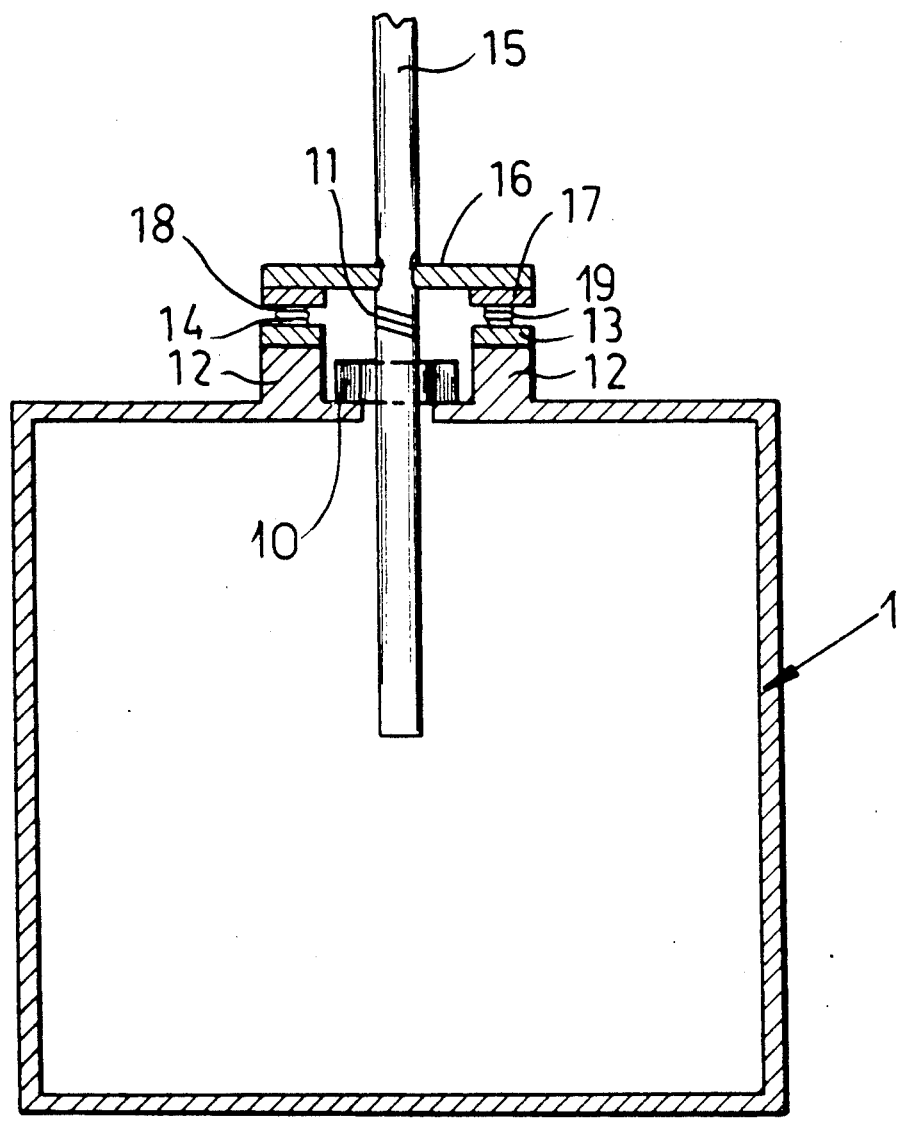
FIG. 2 is a sectional view which illustrates a simple rotary seal.

Let us now consider the stationary seal described in connection with FIGS. 1A, 1B and 1C and assume that its shape is now circular and perfectly planar. Under these circumstances, I can form a rotary seal between the two surfaces. In FIG. 2 I show this configuration as part of a seal for rotating a shaft in a vessel. The vessel 11 can have any desired shape, and is terminated at its top with a flat circular seal seat 12. On this seat, a flat permanent magnet ring 13 magnetized laterally, namely in such a way that its opposing flat surfaces are respectively the north and south poles, is mounted. A superconducting ring 14 with a radius smaller than the outer diameter of the magnet and larger than the inner diameter of the magnet and a width and thickness appropriate for the application, is fastened on top of the magnet 13. The designer may chose to have a separating substance between the magnet and the superconductor, depending on the nature of the bond or fastening means, the strength of the magnetic field generated and the refractoriness of the superconductor. On the shaft 15, a ring-like assembly 16 is attached whose dimensions replicate the seal seat 12. On this assembly, a magnet 17 with the same dimensions and magnetization as the magnet 13 is fastened, oriented in such a manner that opposing poles of the magnets 13 and 17 face each other. A superconducting ring 18 equivalent in shape to the ring 14 is fastened on this magnet as well and the gap 19 is filled with an appropriate diamagnetic colloid.

In order to prevent loading mechanically this seal, a bearing 10 can be used. A number of methods can be used to adjust the gap 19 between the two superconducting rings. For instance the shaft part above the vessel can be threaded in the part of the shaft that descend within the vessel 11 and the degree to which these two parts are threaded in each other determines the gap width. Other techniques well known in prior mechanical art to control in a continuous manner the length of the shaft between the top of the vessel and the ring assembly 16 to vary the gap can of course be used as well. Without limiting such other methods, one could thread the ring assembly 16, or use a telescopic shaft.

A number of parameters determine the efficacy of this seal and the pressure gradient it can maintain. These parameters include the vapor pressure of the carrier at the temperature of operation, wetting angle between the carrier and the materials forming the enclosing gap, intensity of magnetic fields and magnetic field gradients in the gap, extent of the Meissner effect in the superconducting annuli and within the diamagnetic colloid, surface tension of the carrier and the wetting between the superconducting particles and the colloid forming carrier as well as the shape of the gap itself.

The device shown is an effective rotary seal for cryogenic space applications, where the normal ferrofluidic seal cannot perform. Potential carriers depend on the expected operational temperatures, and at present on the availability of superconducting particles with high enough critical temperatures. Since the new bismuth and thallium-based oxide superconductors exhibit transition temperatures around 140 K., ($-133°$ C.), one can provide cryogenic seal applications at a temperature below 140 K. and above the melting point of the cryogenic carriers. A number of candidate cryogenic liquids have been cited above.

Organo-silicon (silicones) based fluids with pour points as low as 150 K. are available commercially, and according to Petrarch Systems, lower pouring temperatures could possible be achieved by partial fluorination. One may have to modify the silicone compounds to impart them with more impermeability to gas diffusion if they are to be used in vacuum-type applications.

It should be clear that a large number of different methods can be used to create magnetic circuits with appropriate magnetic field flux density minima, with and without the use of a superconducting screening element. However, to obtain sharp magnetic field gradients near such field minina, and thus create strong magnetic containment "lenses," the use of superconducting screens is probably preferred.

In order to achieve a seal that can move along a shaft as the shaft accomplishes a linear movement, I can move the fluid at will, without relying on entrainment by the mutual wetting properties of the shaft, the annulum and the diamagnetic colloid.

To achieve this goal, I have invented a number of systems in which magnetic fields can be modulated temporally and spatially. The basis of these devices is the switchable superconductor magnetic field screens, which have been described in more details in separate copending applications mentioned previously, respectively: "Electronic Modulation of Magnetic Fields," "Switchable Superconducting Elements and Pixels Arrays," "Magnetic Field Concentrators and Diffusers" and "Temporal and Spatial Control of Field Topology in Solenoids."

As described in these four disclosures, one can design a variety of patterns or forms from superconducting materials that when positioned in the appropriate magnetic field will modify the morphology of these magnetic fields. If some of these patterns are switched out of the superconducting phase and into the normal phase, the magnetic fields topology will be modulated.

For a linear seal, all that is required is to form a magnetic field minimum between a translating shaft and its enclosing seal. In this field minima, a diamagnetic colloid is locked, while creating a seal between the shaft and the seat. When the shaft is linearly moved relative to the seat, the magnetic field minimum is caused to move at the same rate long the moving shaft, thus creating the required seal. It should be clear that the cross section of the moving shaft can assume any shape which is topologically equivalent to a circle, as long as one can locate and move a magnetic field minimum at the desired location of the seal.

It should be clear that in some specific embodiments of such translational or linear seal, specifically, when the moving shaft has the form of a cylinder, a combined rotary as well as translational movement can be accommodated while keeping the integrity of the seal intact.

SPECIFIC EXAMPLE

As a specific example of the present invention, we describe herein the use of a rotary seal as described in FIG. 2, in a cryogenic magnetic heat pump.

A rotary magnetic heat pump operates at a vacuum of at least a millitor in order to avoid thermal losses and convection. The external vessel is cooled to liquid nitrogen temperature and at the end of the shaft within the container is the magnetic rotary refrigerator. The high temperature heat exchanger of this device is connected to the shaft which is also at liquid nitrogen temperature. The details of the heat pump are not shown, not being part of this invention. In order to allow rotating the shaft into the vacuum in the chamber without excessive friction nor loss of vacuum, the seal as in FIG. 2 is used.

The carrier is 1,1,3,3-tetramethyl-1,3-diethoxydisiloxane, a monomer usually used for extension of prepolymer, with a melting point of 139 K. (Supplier: Petrach Systems, Pa.)

The seal is as described in FIG. 2. The shaft is about 1" in diameter, the external diameter of the seal seat #2 is 1.25", the inner diameter is 0.75". The two laterally magnetized magnets are molded ring magnets (3M company, Minn.) with the same dimensions as the seals seat. The two superconducting rings are made of a Bi, Sr, Ca, Cu based oxide superconductor 1.125" and 0.875" in outer and inner diameter respectively, and 0.125" thick, having a critical temperature of approximately 150 K. The superconducting particles in the 1,1,3,3-tetramethyl-1,3-diethoxydisiloxane carrier are made of the same superconductor. The seal is kept at about 145 K. to prevent freezing of the carrier. The sealing gap, between the two superconducting rings, is about 20 mils thick.

I claim:

1. A seal assembly comprising:
   two juxtaposed surfaces defining a space between them;
   a diamagnetic colloid received in said space and comprising superconductor particles dispersed in a liquid; and
   magnetic-field applying means for localizing said diamagnetic colloid in said space substantially at loci of minima of a magnetic field generated by said magnetic-field applying means.

2. The seal assembly defined in claim 1 wherein said colloid in said space forms a substantially static seal whose shape is topologically that of a ring and separating a space within said shape from a space outside said shape.

3. The seal assembly defined in claim 2 wherein said magnetic-field applying means includes a pair of spacedly juxtaposed oppositely poled magnets, and respective juxtaposed superconductive strips excluding magnetic fields from a region between them in which said diamagnetic colloid is localized.

4. The seal assembly defined in claim 3 wherein said shape lies in a plane.

5. The seal assembly defined in claim 1 wherein said surfaces are parallel to one another.

6. The seal assembly defined in claim 1 wherein said surfaces are annular.

7. The seal assembly defined in claim 1, further comprising means for adjusting a width of a gap between said surfaces.

8. The seal assembly defined in claim 1 wherein said magnetic-field applying means includes a pair of superconductors at said surfaces localizing said diamagnetic colloid between them.

9. The seal assembly defined in claim 8 wherein said superconductors are parallel to one another.

10. The seal assembly defined in claim 8 wherein said superconductors are nonparallel to one another.

11. The seal assembly defined in claim 1 wherein one of said surfaces is formed on a rotating shaft and the other of said surfaces is formed on a stationary seat.

12. The seal assembly defined in claim 11 wherein the position of said minimum changes with shaft movement so as always to be opposite said seat.

* * * * *